United States Patent
Kitamura et al.

(10) Patent No.: US 11,136,415 B2
(45) Date of Patent: Oct. 5, 2021

(54) METHOD FOR PRODUCING HYDROXYPROPYL METHYL CELLULOSE

(71) Applicant: SHIN-ETSU CHEMICAL CO., LTD., Tokyo (JP)

(72) Inventors: Akira Kitamura, Joetsu (JP); Mitsuhiro Yoshida, Joetsu (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 15/918,670

(22) Filed: Mar. 12, 2018

(65) Prior Publication Data

US 2018/0273645 A1 Sep. 27, 2018

(30) Foreign Application Priority Data

Mar. 23, 2017 (JP) .............................. JP2017-057686

(51) Int. Cl.
| | | |
|---|---|---|
| *C08B 11/02* | (2006.01) | |
| *C08B 11/08* | (2006.01) | |
| *C08B 11/193* | (2006.01) | |
| *D21C 9/06* | (2006.01) | |
| *D21C 9/00* | (2006.01) | |

(52) U.S. Cl.
CPC .............. *C08B 11/02* (2013.01); *C08B 11/08* (2013.01); *C08B 11/193* (2013.01); *D21C 9/004* (2013.01); *D21C 9/007* (2013.01); *D21C 9/06* (2013.01)

(58) Field of Classification Search
CPC ... C08B 11/02; C08B 11/00–22; C08B 11/08; C08B 11/193; D21C 9/06; D21C 9/007; D21C 9/004
See application file for complete search history.

(56) References Cited

U.S. PATENT DOCUMENTS

| | | | | |
|---|---|---|---|---|
| 6,602,995 B2 * | 8/2003 | Maruyama | ............. | C08B 11/08 536/124 |
| 2009/0165972 A1 | 7/2009 | Narita | | |
| 2013/0062027 A1 | 3/2013 | Narita | | |

FOREIGN PATENT DOCUMENTS

| | | |
|---|---|---|
| EP | 2 075 260 A1 | 7/2009 |
| EP | 2 733 154 A1 | 5/2014 |
| JP | 2009-173907 A | 8/2009 |
| JP | 2013-57002 A | 3/2013 |
| JP | 2013-539815 A | 10/2013 |
| WO | 2012/051035 A1 | 4/2012 |
| WO | 2016/111929 A1 | 7/2016 |

OTHER PUBLICATIONS

A. W. Anderson and R. W. Swinehart, "The Evaluation of Pulp Requirements for Continuous Alkali Steeping in the Manufacture of Cellulose Ethers", Tappi, vol. 39, No. 8, pp. 548-553, Aug. 1956.
Aug. 17, 2018 Extended Search Report issued in European Patent Application No. 18163077.3.
Oct. 26, 2020 Office Action issued in Japanese Patent Application No. 2018-054807.

* cited by examiner

*Primary Examiner* — Bahar Craigo
(74) *Attorney, Agent, or Firm* — Oliff PLC

(57) ABSTRACT

Provided is a method for producing hydroxypropyl methyl cellulose (HPMC) having high hydroxypropoxy content, low ash content, and low insoluble fiber content. More specifically, provided is a method for producing HPMC having a methoxy degree of substitution of from 1.4 to 2.2 and a hydroxypropoxy molar substitution of from 0.5 to 1.0, including steps of: bringing sheet-like or chip-like pulp into contact with an alkali metal hydroxide solution to obtain a reaction product mixture containing alkali cellulose, removing a liquid portion from the reaction product mixture to obtain the alkali cellulose, reacting the alkali cellulose with an etherifying agent to obtain a crude HPMC, disintegrating the crude HPMC into a disintegrated crude HPMC, dispersing the disintegrated crude HPMC in water to obtain a slurry, filtering the slurry to obtain a cake, and washing the cake.

17 Claims, No Drawings

METHOD FOR PRODUCING HYDROXYPROPYL METHYL CELLULOSE

BACKGROUND OF THE INVENTION

1. Field of the Invention

The present invention relates to a method for producing hydroxypropyl methyl cellulose.

2. Description of the Related Art

A water-soluble cellulose ether has an increased viscosity when dissolved in water so that it is used as a thickener for transparent shampoos or rinses, hair dressing agents, eye drops, contact lens cleaning solutions, and the like. In addition, the water-soluble cellulose ether such as methyl cellulose and hydroxypropyl methyl cellulose has a hydrophilic group and a hydrophobic group in the molecule thereof, shows interfacial activity and is used as a suspension stabilizer in suspension polymerization of vinyl chloride or vinylidene chloride. It is therefore a useful raw material for transparent wrapping materials for domestic use. In any of these applications, the products are desired to be transparent. Unless a cellulose ether has low insoluble fiber content and is transparent with molecular level dissolution even in an aqueous solution, the product obtained using the cellulose ether may be inferior in transparency or in function. There is therefore a demand for providing a cellulose ether having insoluble fiber content reduced as much as possible.

For obtaining alkali cellulose having the insoluble fiber content reduced, there is described a method of immersing a sheet-like pulp having a sheet density of from 0.47 to 1.17 g/ml in an alkali solution in a bath for from 0.5 to 4.5 seconds (A. W. Anderson and R. W. Swinehart, Tappi, vol. 39, no. 8, 548-553, August 1956).

There is also described a method for producing alkali cellulose having a uniform alkali distribution and thereby having the insoluble fiber content reduced, comprising bringing a pulp sheet having a sheet density of 0.60 g/ml or less, a pulp sheet using pine as a raw material, or chips into which the pulp sheet is converted, into contact with an alkali metal hydroxide solution and then removing a liquid from the reaction mixture (JP 2009-173907A).

SUMMARY OF THE INVENTION

When the method described by A. W. Anderson et al. is used, however, the alkali distribution does not become uniform due to short immersion time and the obtained cellulose ether does not have satisfactory insoluble fiber content.

The cellulose ether produced by the method disclosed in JP 2009-173907A has the insoluble fiber content smaller than that of the method described by A. W. Anderson et al. However, when hydroxypropyl methyl cellulose having a high hydroxypropoxy molar substitution (MS) is produced, particles tend to be coarse as a result of entanglement and granulation of the fibers of raw material pulp. In the coarse particles of the crude hydroxypropyl methyl cellulose thus obtained, washing hardly reaches the interior of the particles in a purification step so that a product thus obtained inevitably has high ash content.

In particular, when a hydroxypropyl methyl cellulose ether having a hydroxypropoxy molar substitution (MS) of more than 0.50 is produced, the crude hydroxypropyl methyl cellulose is adhesive so that its long fibers are likely to become adhered and entangled with each other. In addition, granulation in a reactor proceeds because of mediation of propylene glycol in liquid form or mediation of a polymerization product thereof produced in a side reaction of a large amount of propylene oxide introduced into the reactor during a production step. As a result, there are provided coarse particles containing water, salts, methanol, propylene glycols, and byproducts produced from propylene oxide and methyl chloride.

There is therefore a demand for the development of a method for producing hydroxypropyl methyl cellulose having high hydroxypropoxy content, low ash content, and low insoluble fiber content.

The present inventors have carried out an extensive investigation with a view to achieving the above-described object. As a result, it has been found that hydroxypropyl methyl cellulose having low ash content and low insoluble fiber content, even with high hydroxypropoxy content, can be obtained by disintegrating and slurrying crude hydroxypropyl methyl cellulose particles and then filtering the resulting slurry, leading to completion of the invention.

In one aspect of the invention, there is provided a method for producing hydroxypropyl methyl cellulose having a methoxy degree of substitution (DS) of from 1.4 to 2.2 and a hydroxypropoxy molar substitution (MS) of from 0.5 to 1.0, the method comprising steps of bringing sheet-like pulp or chip-like pulp into contact with an alkali metal hydroxide solution to obtain a reaction product mixture containing alkali cellulose, removing a liquid portion from the reaction product mixture to obtain the alkali cellulose, reacting the obtained alkali cellulose with an etherifying agent to obtain crude hydroxypropyl methyl cellulose, disintegrating the crude hydroxypropyl methyl cellulose to obtain disintegrated crude hydroxypropyl methyl cellulose, dispersing the disintegrated crude hydroxypropyl methyl cellulose in water to obtain a slurry, filtering the slurry to obtain a cake, and washing the cake.

According to the present invention, hydroxypropyl methyl cellulose having high hydroxypropoxy content, low ash content and less insoluble fibers can be produced.

DETAILED DESCRIPTION OF THE PREFERRED EMBODIMENTS

The invention will hereinafter be described in further detail.

The step of bringing a sheet-like pulp or chip-like pulp into contact with an alkali metal hydroxide solution to obtain a reaction product mixture containing alkali cellulose will be described.

Examples of a raw material of the sheet-like pulp include wood pulp and cotton linter pulp. From the standpoint of reducing the number of insoluble fibers, pulp derived from wood is particularly preferred. As the wood, needle-leaved trees such as pine, spruce and hemlock, and broad-leaved trees such as eucalyptus and maple can be used. From the standpoint of reducing the number of insoluble fibers, pine is preferred.

The sheet-like pulp can be classified into kraft pulp obtainable by digesting wood with a chemical solution having sodium hydroxide and sodium sulfide as main components, and sulfite pulp obtainable by digesting wood with an acidic sulfite solution. Either of the two is usable, but the haft pulp is preferred from the standpoint of obtaining hydroxypropyl methyl cellulose having low ash content.

The sheet-like pulp has an average fiber length of preferably from 2.2 to 3.0 mm, more preferably from 2.4 to 2.9 mm from the standpoint of obtaining hydroxypropyl methyl cellulose having low ash content. The term "average fiber length" as used herein means a length-weighted average fiber length as described in JIS P8226.

The average fiber length of the sheet-like pulp can be determined by dispersing the sheet-like pulp in a diluting solution sufficiently by a method based on JIS P8226, and subjecting 50 ml of the resulting dispersion to measurement by a Kajaani fiber length analyzer (product of Metso Automation). The measurement of the average fiber length is performed by an apparatus which is incorporated in the Kajaani fiber length analyzer, wherein the apparatus conducts fiber length analyses by image processing. Based on the measurement results, the fiber length can be calculated using a length-weighted average fiber length calculation formula described in JIS P8226.

The intrinsic viscosity serving as an index of the polymerization degree of pulp is preferably less than 900 ml/g, more preferably less than 800 ml/g in the viscosity measurement method in accordance with JIS P8215 from the standpoint of obtaining hydroxypropyl methyl cellulose having low ash content. The lower limit of the intrinsic viscosity is preferably 300 ml/g.

The sheet-like pulp has a thickness of preferably from 0.1 to 5.0 mm, more preferably from 0.5 to 2.0 mm from the standpoint of handling ease in the step of removing the liquid portion.

The sheet-like pulp has a density of preferably 0.60 g/ml or less from the standpoint of reducing the number of insoluble fibers. The lower limit of the density of the sheet-like pulp is not particularly limited insofar as it is available, that is, it is industrially available. The lower limit is usually 0.30 g/ml or more. When the sheet-like pulp using pine as a raw material is used, the sheet density is not limited.

The sheet-like pulp has alpha cellulose content of 90% by weight or more from the standpoint of suppressing a reduction in alkali absorption rate. The alpha cellulose content can be determined by TEST METHOD T429 of TAPPI (Technical Association of the Pulp and Paper Industry).

The sheet-like pulp may be used as is or as chip-like pulp.

The chip-like pulp is preferably pulp in chip form obtained by cutting the sheet-like pulp having a thickness of from 0.1 to 5.0 mm. A method for preparing chip-like pulp is not limited, and existing cutters such as slitter cutter may be used. A cutter capable of continuously processing the sheet is advantageous in investment cost.

The chip usually has a side length of preferably from 2 to 100 mm, more preferably from 3 to 50 mm from the standpoint of handling ease in immersing operation and reduction in the number of insoluble fibers.

The step of removing a liquid portion from the reaction product mixture containing alkali cellulose to obtain the alkali cellulose will next be described.

By removing a liquid portion from the reaction product mixture containing alkali cellulose, obtained after bringing the sheet-like pulp or chip-like pulp into contact with an excess alkali metal hydroxide solution, a surplus portion of the alkali metal hydroxide solution is removed.

This step can be achieved by immersing the sheet-like pulp in an alkali metal hydroxide solution in a bath, and then pressing the resulting sheet-like pulp with a roller or another apparatus; or by immersing the chip-like pulp in an alkali metal hydroxide solution in a bath, and then centrifuging or pressing with another mechanical device the resulting the chip-like pulp. A weight ratio of the alkali metal hydroxide solution to a solid component in the pulp (alkali metal hydroxide solution/solid component in pulp) is preferably from 3 to 5,000, more preferably from 10 to 200, still more preferably from 20 to 60 from the standpoint of the scale of the facility and a reduction in the number of insoluble fibers.

The solid component in the pulp can be obtained from a dry matter content determined by the test method of "Determination of Dry Matter Content for Pulp" specified in JIS P8203:1998. The dry matter content is a ratio of the weight of a sample dried at 105±2° C. until it reaches a constant weight to the weight of the sample before dried, and is expressed by %.

The alkali metal hydroxide solution to be used is not particularly limited insofar as alkali cellulose can be obtained. An aqueous solution of sodium hydroxide or potassium hydroxide is preferred from the standpoint of economy. The concentration of the alkali metal hydroxide solution is preferably from 23 to 60% by weight, more preferably from 35 to 55% by weight. The alkali metal hydroxide solution is preferably an aqueous solution. However, it may be a solution in an alcohol such as ethanol or a solution in a mixed solvent of a water-soluble alcohol and water.

The pulp is brought into contact with the alkali metal hydroxide solution at a temperature of preferably from 5 to 70° C., more preferably from 15 to 60° C. from the standpoint of productivity and suppression of uneven composition of the alkali cellulose.

The pulp is brought into contact with the excess alkali metal hydroxide solution for preferably from 10 to 600 seconds, more preferably from 15 to 120 seconds from the standpoint of obtaining alkali cellulose having a desired composition and suppressing uneven composition of the alkali cellulose.

The amount of the alkali metal hydroxide solution to be used in the step of bringing the pulp into contact is selected so that a ratio of the weight of the alkali metal hydroxide component to the weight of the solid component in the pulp (alkali metal hydroxide component/solid component in pulp) in the alkali cellulose obtained in the step of removing a liquid portion falls within a range of preferably from 1.00 to 2.00, more preferably from 1.05 to 1.80 from the standpoint of reducing the number of insoluble fibers. The weight of the alkali metal hydroxide component may be determined by neutralization titration.

The solid component in the pulp includes, in addition to cellulose which is a main component, an organic matter such as hemicellulose, lignin and resin content, and an inorganic matter such as Si content and Fe content.

The step of reacting the alkali cellulose with an etherifying agent to obtain crude hydroxypropyl methyl cellulose will next be described.

The alkali cellulose thus obtained can be supplied to an etherification reactor as it is or after being optionally cut into pieces. The etherification reactor is, from the standpoint of reducing the number of insoluble fibers, preferably a reactor in which an etherification reaction of the alkali cellulose is conducted while disintegrating pulp fibers by a mechanical force. A reactor having an internal stirring mechanism is therefore preferred as the etherification reactor, and examples of the reactor include a plough type shovel blade mixer. Alternatively, the alkali cellulose may be disintegrated in advance by an apparatus having an internal stirring mechanism before it is poured in the etherification reactor. It is preferable to supply the alkali cellulose to a reactor, remove oxygen from the reactor with a vacuum pump or the like, and introduce an inert gas, preferably nitrogen, into the reactor.

In order to suppress local heat generation in the reactor, an organic solvent inert to the etherification reaction, for example, dimethyl ether may be added in the system after addition of the alkali cellulose.

The etherifying agent is preferably methyl chloride as an alkylating agent, and preferably propylene oxide as a hydroxyalkylating agent. The alkali cellulose and the etherifying agent may be added to the reactor in any order. It is preferably to supply the etherifying agent to the reactor after the alkali cellulose is supplied.

Propylene oxide is supplied to the reactor at a weight ratio of the propylene oxide to the solid component in pulp of preferably from 1.60 to 2.90, more preferably from 1.80 to 2.80 from the standpoint of reducing the number of insoluble fibers and suppressing a cost increase due to the excess use of the propylene oxide.

Methyl chloride is supplied to the reactor at a mole ratio of the methyl chloride to the metal hydroxide component in alkali cellulose of preferably from 0.9 to 1.5, more preferably from 1.0 to 1.4 from the standpoint of reducing the number of insoluble fibers and suppressing a cost increase due to the excess use of the methyl chloride.

The internal temperature of the reactor during supply of the etherifying agent is preferably from 40 to 90° C., more preferably from 50 to 85° C. from the standpoint of reaction control. The etherifying agent is supplied for preferably from 10 to 120 minutes, more preferably from 10 to 100 minutes from the standpoint of reaction control and productivity.

After supply of the etherifying agent, mixing with stirring is preferably continued to complete the etherification reaction. The internal temperature of the reactor after the etherifying agent is supplied is preferably from 70 to 120° C., more preferably from 80 to 110° C. from the standpoint of reaction controllability.

After supply of the etherifying agent, mixing with stirring is conducted for preferably from 10 to 80 minutes, more preferably from 20 to 60 minutes from the standpoint of productivity.

After completion of the etherification reaction, the gas is discharged from the reactor and then the crude hydroxypropyl methyl cellulose is taken out from the reactor. The crude hydroxypropyl methyl cellulose is in coarse particle form with an average particle size of preferably from 3.5 to 10.0 mm, more preferably from 4.0 to 8.0 mm, though depending on the etherification reaction conditions. In the invention, crude hydroxypropyl methyl cellulose having an average particle size of less than 3.5 mm or more than 10.0 mm is hardly obtained. As the average particle size, cumulative 50% particle size in cumulative weight-based particle size distribution determined by sieve analysis is used.

The step of disintegrating the hydroxypropyl methyl cellulose to obtain disintegrated crude hydroxypropyl methyl cellulose will next be described.

The crude hydroxypropyl methyl cellulose thus taken out from the reactor contains, in the particles thereof, water, salts, methanol, propylene glycols, and byproducts produced from propylene oxide and methyl chloride, in addition to hydroxypropyl methyl cellulose. Even if this crude hydroxypropyl methyl cellulose is purified as it is, the final product inevitably has a high ash content because of the difficulty in washing the interior of the particles.

The crude hydroxypropyl methyl cellulose is preferably supplied to a disintegrator without exposing it to acid or alkali conditions from the standpoint of reducing the number of insoluble fibers.

The crude hydroxypropyl methyl cellulose is disintegrated by means of a disintegrator to obtain disintegrated crude hydroxypropyl methyl cellulose. The disintegrator is not particularly limited insofar as it can disintegrate the crude cellulose into a form suitable for purification to lower ash content. It is preferably an apparatus capable of continuously disintegrating an adhesive and tacky substance and is preferably an apparatus capable of disintegrating by a shear force. The disintegrator is preferably a kneader, more preferably a continuous kneader, particularly preferably a continuous biaxial kneader.

The biaxial kneader is a closed type kneader in which two kneading shafts are hidden with a barrel. From the standpoint of obtaining hydroxypropyl methyl cellulose having low ash content, a kneader in which the two kneading shafts can be rotated in the same direction is preferred. In addition, a kneader capable of controlling the kneading degree or staying time therein by changing the shape of the paddle incorporated in the shaft or by replacing the paddle with another paddle. Further, a kneader having an optional structure capable of controlling the temperature in the kneader is preferred. As a commercially available product, KRC kneader manufactured by Kurimoto Ltd. is preferred.

The disintegrated crude hydroxypropyl methyl cellulose has an average particle size of preferably from 0.5 to 1.6 mm, particularly preferably from 0.8 mm to 1.5 mm from the standpoint of preventing prolongation of the later washing step and obtaining hydroxypropyl methyl cellulose having low ash content. As an average particle size of the disintegrated crude hydroxypropyl methyl cellulose, cumulative 50% particle size in cumulative weight-based particle size distribution determined by sieve analysis is used.

In order to control the particle size of the disintegrated crude hydroxypropyl methyl cellulose, adjustment of the number of revolutions of the kneader or replacement with another paddle is preferred. As the paddle, for example, any combination of a flat paddle, a helical paddle, and a reverse helical paddle can be used.

The step of dispersing the disintegrated crude hydroxypropyl methyl cellulose in water to obtain a slurry will next be described.

The disintegrated crude hydroxypropyl methyl cellulose is dispersed in water to obtain a slurry. The temperature of water to be used for obtaining a slurry is preferably from 75 to 100° C., more preferably from 80 to 98° C. because the slurry is required to be obtained at a temperature exceeding the gelation temperature of the crude hydroxypropyl methyl cellulose. The temperature of the slurry containing the disintegrated crude hydroxypropyl methyl cellulose is preferably from 75 to 100° C., more preferably from 80 to 98° C. because it is selected to be a temperature exceeding the thermal gelation temperature of the crude hydroxypropyl methyl cellulose. The thermal gelation temperature can be measured using a method described in Japanese Journal of Polymer Science and Technology Vol. 38, No. 3, P133 to 137.

A weight ratio of solid component of hydroxypropyl methyl cellulose in disintegrated crude hydroxypropyl methyl cellulose to a total amount of slurry serves as an index of the concentration of the solid component in the slurry. It is preferably from 0.05 to 0.20, more preferably from 0.08 to 0.15 from the standpoint of preventing prolongation of the later washing step and obtaining hydroxypropyl methyl cellulose having low ash content.

The slurry is obtained preferably in a tank capable of controlling an internal temperature by means of a jacket and capable of internal stirring for mixing.

The slurry is dispersed in water preferably for from 1 to 3 hours to dissolve and extract substances other than the hydroxypropyl methyl cellulose in the disintegrated crude hydroxypropyl methyl cellulose.

In order to keep the delocalized and uniform concentration of the slurry, mixing with stirring in the tank are preferred.

The step of filtering the slurry to obtain a cake and washing the cake will next be described.

The slurry contains, in addition to the hydroxypropyl methyl cellulose and water which are main components, salts, methanol, propylene glycols, and byproducts produced from propylene oxide and methyl chloride.

Filtration of the slurry and washing of the resulting cake are performed continuously by using, for example, a device for filtration and cleaning, referred to herein simply as a filtration-washing machine.

From the standpoint of obtaining hydroxypropyl methyl cellulose having low ash content, the filtration-washing machine is preferably a pressure rotary filter capable of continuously carrying out pressure filtration, and more preferably the filtration-washing machine comprises a plurality of segment zones inside wherein each segment zone has a structure in which supply of the slurry, filtration of the slurry to form a cake, supply of steam, supply of washing water and filtration, discharge of a washed product outside the machine, and washing of the filter after discharge can be carried out. More specifically, a rotary pressure filter manufactured by BHS-Sonthofen in Germany is preferred.

The supply flow rate of the slurry to the filtration-washing machine is preferably controlled based on the washing capacity of the filtration-washing machine per hour. The slurry is supplied preferably using a pump from the standpoint of operability.

The slurry supplied to the filtration-washing machine is subjected to pressure filtration using a filter to obtain a cake.

The cake thus obtained contains, in addition to hydroxypropyl methyl cellulose and water which are main components, salts, methanol, propylene glycols, and byproducts produced from propylene oxide and methyl chloride.

A pressure applied to the slurry during pressure filtration is preferably from 0.001 to 1 MPa, more preferably from 0.01 to 0.5 MPa from the standpoint of obtaining hydroxypropyl methyl cellulose having low ash content.

The cake obtained by the filtration of the slurry is washed preferably through supply of steam, supply of washing water, and pressure filtration in the filtration-washing machine from the standpoint of operability. The washing water is supplied to the filtration-washing machine by means of a pump from the standpoint of operability.

The steam to be supplied to the filtration-washing machine is preferably from 100 to 185° C., more preferably from 100 to 160° C. and preferably from 0.001 to 1.0 MPa, more preferably from 0.1 to 0.5 MPa from the standpoint of purifying hydroxypropyl methyl cellulose having a high dissolution temperature of preferably 50° C., and obtaining hydroxypropyl methyl cellulose having low ash content. The steam is supplied before and after supply of washing water and pressure filtration using a filter from the standpoint of obtaining hydroxypropyl methyl cellulose having low ash content.

The temperature of the washing water to be supplied to the filtration-washing machine is preferably from 60 to 120° C., more preferably from 75 to 99° C. from the standpoint of obtaining hydroxypropyl methyl cellulose having low ash content.

A pressure applied to the washing water to be supplied to the filtration-washing machine during pressure filtration is preferably from 0.001 to 1 MPa, more preferably from 0.01 to 0.5 MPa from the standpoint of obtaining hydroxypropyl methyl cellulose having low ash content.

Regarding an amount of the washing water to be supplied to the filtration- washing machine, the weight ratio of the washing water to the solid component of hydroxypropyl methyl cellulose after washing is preferably from 5 to 50, more preferably from 8 to 35 from the standpoint of obtaining hydroxypropyl methyl cellulose having low ash content and also from an economic standpoint.

The hydroxypropyl methyl cellulose washing capacity of the filtration-washing machine per filtration area and per hour is preferably from 80 to 800 kg/m$^2$·hr, more preferably from 130 to 600 kg/m$^2$·hr from the standpoint of carrying out industrial-scale purification.

After washing the cake, the washed product discharged from the filtration-washing machine is dried in a usual method of drying hydroxypropyl methyl cellulose to obtain hydroxypropyl methyl cellulose. For example, a conductive heat transfer groove type agitating dryer may be used for drying.

The hydroxypropyl methyl cellulose thus obtained may be optionally pulverized, by using a usual pulverizer such as a ball mill, a roller mill and an impact grinder. Then, it is classified through a sieve to adjust its particle size.

The methoxy degree of substitution (DS) of the resulting hydroxypropyl methyl cellulose is from 1.4 to 2.2, preferably from 1.5 to 2.1 and the hydroxypropoxy molar substitution (MS) is from 0.50 to 1.0, preferably from 0.50 to 0.8. When the methoxy degree of substitution (DS) is less than 1.2 and/or the hydroxypropoxy molar substitution (MS) is less than 0.50, the hydroxypropyl methyl cellulose having low insoluble fiber content cannot be obtained. It is difficult to produce hydroxypropyl methyl cellulose which satisfies both or either one of the following conditions: that is, the methoxy degree of substitution (DS) exceeding 2.2 and the hydroxypropoxy molar substitution (MS) exceeding 1.00.

Typically, the methoxy degree of substitution (DS) is an average number of hydroxy groups substituted by a methoxy group, per glucose ring of cellulose and the hydroxypropoxy molar substitution (MS) may be calculated based on the measurement results using a method specified in the Japanese Pharmacopoeia Seventeenth Edition, while using DS for substitution.

The viscosity at 20° C. of a 2% by weight aqueous solution of the resulting hydroxypropyl methyl cellulose is preferably from 300 to 6000 mPa·s, more preferably from 500 to 4000 mPa·s. The viscosity at 20° C. of a 2% by weight aqueous solution of hydroxypropyl methyl cellulose may be measured using a Brookfield viscometer in accordance with JIS Z8803 when the viscosity is 600 mPa·s or more; and using an Ubbelohde viscometer in accordance with JIS K2283-1993 when the viscosity is less than 600 mPa·s.

The ash content of the hydroxypropyl methyl cellulose thus obtained is preferably less than 0.5% by weight. The ash content of more than 0.5% by weight may adversely affect the quality of final products when such hydroxypropyl methyl cellulose is used in applications containing a step of burning a mixture containing the hydroxypropyl methyl cellulose or in applications of using the hydroxypropyl methyl cellulose after dissolving it in water or the like. The lower limit of the ash content is 0.05% by weight. The ash content can be measured using a method specified in the Japanese Pharmacopoeia Seventeenth Edition.

The transmittance at 30° C. of a 2% by weight aqueous solution of the hydroxypropyl methyl cellulose is preferably 96% or more, more preferably 98% or more when measured with a photoelectric colorimeter PC-50 using a cell length of 20 mm and a wavelength of 720 nm.

When hydroxypropyl methyl cellulose having an insufficient degree of substitution or being produced without a uniform substitution reaction is dissolved in water, many insoluble fibrous matters having a size of from about 16 to 200 µm remain inevitably. The number of the insoluble fibrous matters may be measured with a Coulter counter or multisizer. More specifically, it can be measured by dissolving hydroxypropyl methyl cellulose in an aqueous electrolyte solution ISOTON II (product of Beckman Coulter) for Coulter counter in a constant temperature bath of 25° C. to obtain a 0.1% by weight aqueous solution, and counting the number of insoluble fibers being present in 2 ml of the solution and having a size of 16 µm or more and 200 µm or less with Coulter Counter TA II manufactured by Beckman Coulter or a multisizer by using an aperture tube having a diameter of 400 µm. Hydroxypropyl methyl cellulose having preferably 100 or less, more preferably 30 or less, still more preferably 20 or less insoluble fibers is excellent. If the concentration of hydroxypropyl methyl cellulose is too low to measure, the number of insoluble fibers is counted in an appropriately higher concentration solution and then converted into a value in a 0.1% by weight solution.

EXAMPLES

The invention will hereinafter be described in detail by Examples and Comparative Examples. It should not be construed that the invention is limited to or by Examples.

Example 1

Alkali cellulose was obtained by immersing sheet-like pulp which was kraft pulp obtained from pine as a raw material and had α-cellulose content of 97%, an intrinsic viscosity of 720 mug and a length-average fiber length of 2.6 mm, in a 49% by weight aqueous NaOH solution of 40° C. for 50 seconds; and then pressing the resulting pulp to remove an excess 49% by weight aqueous NaOH solution. The weight ratio of (49% by weight aqueous NaOH solution) to (solid component in pulp) in the immersing step was 200. The weight ratio of (NaOH component in alkali cellulose thus obtained) to (solid component in pulp) was 1.49.

The alkali cellulose (20 kg) thus obtained was placed in a jacketed pressure reactor with internal stirring, followed by vacuum and purging with nitrogen to remove oxygen from the reactor sufficiently. Next, internal stirring was performed while controlling the temperature in the reactor to 60° C. Then, 2.4 kg of dimethyl ether was added and the temperature in the reactor was controlled to keep it at 60° C. After addition of dimethyl ether, methyl chloride was added in such an amount that a molar ratio of (methyl chloride) to (NaOH component in alkali cellulose) becomes 1.3, and propylene oxide was added in such an amount that a weight ratio of (propylene oxide) to (solid component in pulp) becomes 1.97, while controlling the temperature in the reactor from 60° C. to 80° C. After addition of methyl chloride and propylene oxide, the temperature in the reactor was controlled from 80° C. to 90° C. Further, the reaction was continued for 20 minutes at 90° C. Then, the gas was discharged from the reactor and crude hydroxypropyl methyl cellulose was taken out from the reactor. The temperature of the crude hydroxypropyl methyl cellulose at the time when it was taken out was 62° C. The cumulative 50% particle size in cumulative weight-based particle size distribution determined based on a ratio of the crude hydroxypropyl methyl cellulose passing through the openings of five sieves, each having a different opening size, was measured. As a result, the coarse particles had an average particle size of 6.2 mm.

The crude hydroxypropyl methyl cellulose thus obtained was introduced at 10 kg/hr into a continuous biaxial kneader (KRC kneader S1, L/D=10.2, internal volume of 0.12 liter, rotation speed of 150 rpm) to obtain disintegrated crude hydroxypropyl methyl cellulose. The average particle size thereof was 1.4 mm as a result of measuring similarly using five sieves different in opening size.

A slurry was obtained by adding hot water of 80° C. to the disintegrated crude hydroxypropyl methyl cellulose in a tank with jacket temperature control in such an amount that a weight ratio of (amount of hydroxypropyl methyl cellulose in disintegrated crude hydroxypropyl methyl cellulose) to (total amount of slurry) became 0.1. The slurry was stirred at a constant temperature of 80° C. for 60 minutes.

Then, the slurry was supplied to a rotary pressure filter (product of BHS-Sonthofen) having a rotation speed of 0.5 rotation/minute and being heated in advance. The temperature of the slurry was 93° C. The slurry was supplied using a pump and the discharge pressure of the pump was 0.2 MPa. The filtration filter of the rotary pressure filter had an opening size of 80 µm and a filtration area of 0.12 m$^2$. The slurry supplied to the rotary pressure filter was converted into a cake by filtration.

After steam of 0.3 MPa was supplied to the cake thus obtained, hot water of 95° C. was supplied in such an amount that a weight ratio of (hot water) to (solid component of hydroxypropyl methyl cellulose after washing) became 10.0, followed by filter filtration. The hot water was supplied at a discharge pressure of 0.2 MPa by means of a pump. After supply of the hot water, steam of 0.3 MPa was supplied. Then, the washed product on the surface of the filter was removed by a scraper and discharged outside of the filtration-washing machine. The procedure from the supply of the slurry to the discharge of the washed product was performed continuously.

The water content of the washed product thus discharged was 52.8% by weight as a result of measurement using a heating and drying type moisture meter.

The washed product discharged from the rotary pressure filter was dried using an air supply dryer of 80° C. and pulverized in an impact mill Victory mill to obtain hydroxypropyl methyl cellulose. Production conditions are shown in Table 1.

The methoxy degree of substitution (DS) of the resulting hydroxypropyl methyl cellulose was 1.84, the hydroxypropoxy molar substitution (MS) was 0.62, the viscosity at 20° C. of 2% by weight aqueous solution was 1,200 mPa·s, and the ash content measured by ashing, in a muffle furnace, the hydroxypropyl methyl cellulose placed in a heat-resistant crucible, and determining the ash content by weight measurement, was 0.25%. The transmittance at 30° C. of 2% by weight aqueous solution measured with a photoelectric colorimeter PC-50 using a cell length of 20 mm and a wavelength of 720 nm was 99.0%. The number of insoluble fibers having a size of 16 µm or more and 200 µm or less as measured using Multisizer 3 (product of Beckman Coulter) was 9.

Example 2

Crude hydroxypropyl methyl cellulose was obtained in the same manner as in Example 1. The crude hydroxypropyl methyl cellulose was in coarse particle form with an average particle size of 6.5 mm.

The crude hydroxypropyl methyl cellulose thus obtained was introduced at 5 kg/hr into a continuous biaxial kneader (KRC Kneader S1, L/D=10.2, internal volume: 0.12 liter, rotation speed: 120 rpm) having another paddle to obtain disintegrated crude hydroxypropyl methyl cellulose. The average particle size of the disintegrated crude hydroxypropyl methyl cellulose measured using the same apparatus as in Example 1 was 0.7 mm.

A slurry of the disintegrated crude hydroxypropyl methyl cellulose was obtained in the same manner as in Example 1. Next, it was washed using a rotary pressure filter in the same manner as in Example 1. The washed product discharged from the rotary pressure filter had water content of 51.5 mass %. The washed product discharged from the rotary pressure filter was treated in the same manner as in Example 1 to obtain hydroxypropyl methyl cellulose. Production conditions are shown in Table 1.

The methoxy degree of substitution (DS) of the resulting hydroxypropyl methyl cellulose was 1.84, the hydroxypropoxy molar substitution (MS) was 0.62, the viscosity at 20° C. of 2% by weight aqueous solution was 1,200 mPa·s, and the ash content was 0.18% by weight. The transmittance at 30° C. of 2% by weight aqueous solution measured with a photoelectric colorimeter PC-50 using a cell length of 20 mm and a wavelength of 720 nm was 99.0%. The number of insoluble fibers having a size of 16 µm or more and 200 µm or less was 9.

Example 3

Crude hydroxypropyl methyl cellulose was obtained in the same manner as in Example 1 except that propylene oxide was added in such an amount that a weight ratio of (propylene oxide) to (solid component in pulp) became 1.85, while keeping the same weight ratio of (NaOH component in alkali cellulose) to (solid component in pulp). The crude hydroxypropyl methyl cellulose was in coarse particle form with an average particle size of 5.9 mm.

The crude hydroxypropyl methyl cellulose thus obtained was disintegrated in the same manner as in Example 1 to obtain a disintegrated crude hydroxypropyl methyl cellulose. The average particle size of the disintegrated crude hydroxypropyl methyl cellulose measured using the same apparatus as in Example 1 was 1.5 mm.

After a slurry of the disintegrated crude hydroxypropyl methyl cellulose was obtained in the same manner as in Example 1, it was washed using a rotary pressure filter in the same manner as in Example 1. The washed product discharged from the rotary pressure filter had water content of 53.0% by weight. The washed product discharged from the rotary pressure filter was treated in the same manner as in Example 1 to obtain hydroxypropyl methyl cellulose. Production conditions are shown in Table 1.

The methoxy degree of substitution (DS) of the resulting hydroxypropyl methyl cellulose was 1.83, the hydroxypropoxy molar substitution (MS) was 0.57, the viscosity at 20° C. of 2% by weight aqueous solution was 1,250 mPa·s, and the ash content was 0.23% by weight. The transmittance at 30° C. of 2% by weight aqueous solution measured with a photoelectric colorimeter PC-50 using a cell length of 20 mm and a wavelength of 720 nm was 99.0%. The number of insoluble fibers having a size of 16 µm or more and 200 µm or less was 10.

Example 4

Alkali cellulose was obtained by immersing the same pulp as in Example 1 in a 49% by weight aqueous NaOH solution of 40° C. for 60 seconds and then pressing the resulting pulp to remove an excess 49% by weight aqueous NaOH solution. A weight ratio of (49% by weight aqueous NaOH solution) to (solid component in pulp) in the immersing step was 200. A weight ratio of (NaOH component in alkali cellulose thus obtained) to (solid component in pulp) was 1.60. Crude hydroxypropyl methyl cellulose was obtained in the same manner as in Example 1 except that propylene oxide was added in such an amount that a weight ratio of (propylene oxide) to (solid component in pulp) became 2.80. The crude hydroxypropyl methyl cellulose was in coarse particle form with an average particle size of 7.1 mm.

The crude hydroxypropyl methyl cellulose thus obtained was disintegrated in the same manner as in Example 1. The disintegrated crude hydroxypropyl methyl cellulose had an average particle size of 1.4 mm.

A slurry of the disintegrated crude hydroxypropyl methyl cellulose was obtained in the same manner as in Example 1. Next, it was washed using a rotary pressure filter in the same manner as in Example 1. The washed product discharged from the rotary pressure filter had water content of 53.5% by weight. The washed product discharged from the rotary pressure filter was treated in the same manner as in Example 1 to obtain hydroxypropyl methyl cellulose. Production conditions are shown in Table 1.

The methoxy degree of substitution (DS) of the resulting hydroxypropyl methyl cellulose was 1.84, the hydroxypropoxy molar substitution (MS) was 0.75, the viscosity at 20° C. of 2% by weight aqueous solution was 790 mPa·s, and the ash content was 0.28% by weight. The transmittance at 30° C. of 2% by weight aqueous solution measured with a photoelectric colorimeter PC-50 using a cell length of 20 mm and a wavelength of 720 nm was 99.0%. The number of insoluble fibers having a size of 16 µm or more and 200 µm or less was 7.

Example 5

Alkali cellulose was obtained by immersing the same sheet-like pulp as in Example 1 in a 49% by weight aqueous NaOH solution of 40° C. for 44 seconds and then pressing to remove an excess 49% by weight aqueous NaOH solution. A weight ratio of (49% by weight aqueous NaOH solution) to (solid component in pulp) in the immersing step was 200. A weight ratio of (NaOH component in alkali cellulose thus obtained) to (solid component in pulp) was 1.19. Crude hydroxypropyl methyl cellulose was obtained in the same manner as in Example 1 except that propylene oxide was added in such an amount that a weight ratio of (propylene oxide) to (solid component in pulp) became 2.04. The crude hydroxypropyl methyl cellulose thus obtained was in coarse particle form with an average particle size of 6.5 mm.

The crude hydroxypropyl methyl cellulose thus obtained was disintegrated in the same manner as in Example 1. The disintegrated crude hydroxypropyl methyl cellulose had an average particle size of 1.3 mm.

A slurry of the disintegrated crude hydroxypropyl methyl cellulose was obtained in the same manner as in Example 1. Next, it was washed using a rotary pressure filter in the same manner as in Example 1. The washed product discharged from the rotary pressure filter had water content of 54.0% by weight. The washed product discharged from the rotary pressure filter was treated in the same manner as in Example 1 to obtain hydroxypropyl methyl cellulose. Production conditions are shown in Table 1.

The methoxy degree of substitution (DS) of the resulting hydroxypropyl methyl cellulose was 1.58, the hydroxypropoxy molar substitution (MS) was 0.84, the viscosity at 20° C. of 2% by weight aqueous solution was 1500 mPa·s, and the ash content was 0.24% by weight. The transmittance at 30° C. of 2% by weight aqueous solution measured with a photoelectric colorimeter PC-50 using a cell length of 20 mm and a wavelength of 720 µm was 99.0%. The number of insoluble fibers having a size of 16 µm or more and 200 µm or less or less was 7.

Example 6

The same pulp as in Example 1 was converted into 15-mm cubic chips. Alkali cellulose was obtained by immersing the chip-like pulp in a 49% by weight aqueous NaOH solution of 40° C. for 45 seconds and then pressing the resulting pulp using a rotary basket having a centrifugal effect of 500 to remove an excess 49% by weight aqueous NaOH solution. A weight ratio of (49% by weight aqueous NaOH solution) to (solid component in pulp) in the immersing step was 15. A weight ratio of (NaOH component in alkali cellulose thus obtained) to (solid component in pulp) was 1.49. Crude hydroxypropyl methyl cellulose obtained in the same manner as in Example 1 by using the resulting alkali cellulose as a raw material was in coarse particle form with an average particle size of 5.1 mm.

The crude hydroxypropyl methyl cellulose thus obtained was disintegrated in the same manner as in Example 1. The disintegrated crude hydroxypropyl methyl cellulose had an average particle size of 1.4 mm.

A slurry of the disintegrated crude hydroxypropyl methyl cellulose was obtained in the same manner as in Example 1. Next, it was washed using a rotary pressure filter in the same manner as in Example 1. The washed product discharged from the rotary pressure filter had water content of 52.0% by weight. The washed product discharged from the rotary pressure filter was treated in the same manner as in Example 1 to obtain hydroxypropyl methyl cellulose. Production conditions are shown in Table 1.

The methoxy degree of substitution (DS) of the resulting hydroxypropyl methyl cellulose was 1.83, the hydroxypropoxy molar substitution (MS) was 0.64, the viscosity at 20° C. of 2% by weight aqueous solution was 1700 mPa·s, and the ash content was 0.25% by weight. The transmittance at 30° C. of 2% by weight aqueous solution measured with a photoelectric colorimeter PC-50 using a cell length of 20 mm and a wavelength of 720 nm was 99.0%. The number of insoluble fibers having a size of 16 µm or more and 200 µm or less was 8.

Comparative Example 1

Crude hydroxypropyl methyl cellulose was obtained using the same pulp as in Example 1 in the same manner as of Example 1. The crude hydroxypropyl methyl cellulose was in coarse particle form with an average particle size of 6.5 mm.

A slurry was obtained by adding hot water of 80° C. to the crude hydroxypropyl methyl cellulose thus obtained in the absence of disintegration in such an amount that a weight ratio of (hydroxypropyl methyl cellulose pure content) to (slurry) became 0.1, and stirring the resulting mixture at a constant temperature of 80° C. for 60 minutes. Next, the slurry was washed using a rotary pressure filter in the same manner as in Example 1. The washed product discharged from the rotary pressure filter had water content of 56.2% by weight.

The washed product discharged from the rotary pressure filter was treated in the same manner as in Example 1 to obtain hydroxypropyl methyl cellulose. Production conditions are shown in Table 1.

The methoxy degree of substitution (DS) of the resulting hydroxypropyl methyl cellulose was 1.84, the hydroxypropoxy molar substitution (MS) was 0.62, the viscosity at 20° C. of 2% by weight aqueous solution was 1,200 mPa·s, and the ash content was 8.52% by weight. The transmittance at 30° C. of 2% by weight aqueous solution measured with a photoelectric colorimeter PC-50 using a cell length of 20 mm and a wavelength of 720 nm was 99.0%. The number of insoluble fibers having a size of 16 µm or more and 200 µm or less was 12.

Comparative Example 2

The same pulp as in Example 1 was pulverized in a knife mill into powdery pulp having an average particle size of 200 µm. After alkali cellulose having a molar ratio of (NaOH component) to (solid component in pulp) of 6.03 was produced by charging 5.0 kg, as an anhydrous content, of the powdery pulp thus obtained in a jacketed pressure reactor with internal stirring, vacuuming, and then spraying 15.2 kg of 49% by weight NaOH of 40° C. under stirring, oxygen in the reactor was removed sufficiently by vacuum and purging with nitrogen.

Next, internal stirring was performed while controlling the temperature in the reactor to 60° C. Then, 2.4 kg of dimethyl ether was added and the temperature in the reactor was controlled to be kept at 60° C. After addition of dimethyl ether, methyl chloride was added in such an amount that a molar ratio of (methyl chloride) to (NaOH component in alkali cellulose) of 1.3, and propylene oxide was added in such an amount that a weight ratio of (propylene oxide) to (solid component in pulp) of 1.97, while controlling the temperature in the reactor to be from 60° C. to 80° C. After addition of methyl chloride and propylene oxide, the temperature in the reactor was controlled to be from 80° C. to 90° C. and the reaction was continued further for 20 minutes at 90° C. Then, the gas was discharged from the reactor and the crude hydroxypropyl methyl cellulose was taken out from the reactor. The crude hydroxypropyl methyl cellulose had an average particle size of 1.8 mm.

A slurry was obtained by adding hot water of 80° C. to the crude hydroxypropyl methyl cellulose thus obtained in the absence of disintegration in such an amount that a weight ratio of (hydroxypropyl methyl cellulose pure content) to (slurry) became 0.1, and stirring the resulting mixture at a constant temperature of 80° C. for 60 minutes. Next, the slurry was washed using a rotary pressure filter in the same manner as in Example 1. The washed product discharged from the rotary pressure filter had water content of 48.1% by weight.

The washed product discharged from the rotary pressure filter was treated in the same manner as in Example 1 to obtain hydroxypropyl methyl cellulose. Production conditions are shown in Table 1.

The methoxy degree of substitution (DS) of the resulting hydroxypropyl methyl cellulose was 1.81, the hydroxypropoxy molar substitution (MS) was 0.65, the viscosity at 20° C. of 2% by weight aqueous solution was 2,000 mPa·s, and the ash content was 0.25% by weight. The transmittance at 30° C. of 2% by weight aqueous solution measured with a photoelectric colorimeter PC-50 using a cell length of 20 mm and a wavelength of 720 μm was 95.0%. The number of insoluble fibers having a size of 16 μm or more and 200 μm or less was 98.

Comparative Example 3

Alkali cellulose was obtained by immersing the same pulp as in Example 1 in a 49% by weight aqueous NaOH solution of 40° C. for 46 seconds and pressing the resulting pulp to remove an excess 49% by weight aqueous NaOH solution. A weight ratio of (49% by weight aqueous NaOH solution) to (solid component in pulp) in the immersing step was 200. A weight ratio of (NaOH component in alkali cellulose thus obtained) to (solid component in pulp) was 1.25. Crude hydroxypropyl methyl cellulose was obtained in the same manner as in Example 1 except that propylene oxide was added in such an amount that a weight ratio of (propylene oxide) to (solid component in pulp) became 1.31. The crude hydroxypropyl methyl cellulose thus obtained had an average particle size of 2.0 mm.

A slurry was obtained by adding hot water of 90° C. to 500 g of the crude hydroxypropyl methyl cellulose thus obtained in such an amount that a weight ratio of (hydroxypropyl methyl cellulose pure content) to (slurry) became 0.1, and stirring the resulting mixture at a constant temperature of 90° C. for 60 minutes. Next, the slurry was washed using a rotary pressure filter in the same manner as in Example 1. The washed product discharged from the rotary pressure filter had water content of 49.8% by weight.

The washed product discharged from the rotary pressure filter was treated in the same manner as in Example 1 to obtain hydroxypropyl methyl cellulose. Production conditions are shown in Table 1.

The methoxy degree of substitution (DS) of the resulting hydroxypropyl methyl cellulose was 1.90, the hydroxypropoxy molar substitution (MS) was 0.24, the viscosity at 20° C. of 2% by weight aqueous solution was 1,500 mPa·s, and the ash content was 0.20% by weight. The transmittance at 30° C. of 2% by weight aqueous solution measured with a photoelectric colorimeter PC-50 using a cell length of 20 mm and a wavelength of 720 nm was 98.5%. The number of insoluble fibers having a size of 16 μm or more and 200 μm or less was 30.

Comparative Example 4

Alkali cellulose was obtained by immersing the same pulp as in Example 1 in a 49% by weight aqueous NaOH solution of 40° C. for 46 seconds and then pressing to remove an excess 49% by weight aqueous NaOH solution. A weight ratio of (49% by weight aqueous NaOH solution) to (solid component in pulp) in the immersing step was 200. A weight ratio of (NaOH component in alkali cellulose thus obtained) to (solid component in pulp) was 1.25. Crude hydroxypropyl methyl cellulose was obtained in the same manner as in Example 1 except that propylene oxide was added in such an amount that a weight ratio of (propylene oxide) to (solid component in pulp) became 1.26. The crude hydroxypropyl methyl cellulose thus obtained had an average particle size of 2.2 mm.

A slurry was obtained by adding hot water of 90° C. to 500 g of the resulting crude hydroxypropyl methyl cellulose in such an amount that a weight ratio of (hydroxypropyl methyl cellulose pure content) to (slurry) became 0.1, and stirring the resulting mixture at a constant temperature of 90° C. for 60 minutes. Next, the slurry was washed using a rotary pressure filter in the same manner as in Example 1. The washed product discharged from the rotary pressure filter had water content of 50.2% by weight.

The washed product discharged from the rotary pressure filter was treated in the same manner as in Example 1 to obtain hydroxypropyl methyl cellulose. Production conditions are shown in Table 1.

With respect to the hydroxypropyl methyl cellulose thus obtained, the methoxy degree of substitution (DS) was 1.80, the hydroxypropoxy molar substitution (MS) was 0.39, the viscosity at 20° C. of 2% by weight aqueous solution was 1,800 mPa·s, and the ash content was 0.51% by weight. The transmittance at 30° C. of 2% by weight aqueous solution measured with a photoelectric colorimeter PC-50 using a cell length of 20 mm and a wavelength of 720 nm was 98.0%. The number of insoluble fibers having a size of 16 μm or more and 200 μm or less was 28.

TABLE 1

| | production conditions | | | | | properties of hydroxypropyl methyl cellulose | | | | | |
|---|---|---|---|---|---|---|---|---|---|---|---|
| | alkali cellulose | etherification | | | | | | | | | |
| | shape of pulp when contacted with NaOH (-) | weight ratio of NaOH component in alkali cellulose to solid component in pulp (kg/kg) | weight ratio of propylene oxide to solid component in pulp (kg/kg) | disintegration average particle size before disintegration (mm) | average particle size after disintegration (mm) | DS (-) | MS (-) | viscosity at 20° C. of 2% by weight aq. solution (mPa · s) | ash content (wt %) | transmittance (%) | number of insoluble fibers |
| Example 1 | sheet | 1.49 | 1.97 | 6.2 | 1.4 | 1.84 | 0.62 | 1200 | 0.25 | 99.0 | 9 |
| Example 2 | sheet | 1.49 | 1.97 | 6.5 | 0.7 | 1.84 | 0.62 | 1200 | 0.18 | 99.0 | 9 |
| Example 3 | sheet | 1.49 | 1.85 | 5.9 | 1.5 | 1.83 | 0.57 | 1250 | 0.23 | 99.0 | 10 |
| Example 4 | sheet | 1.60 | 2.80 | 7.1 | 1.4 | 1.84 | 0.75 | 790 | 0.28 | 99.0 | 7 |
| Example 5 | sheet | 1.19 | 2.04 | 6.5 | 1.3 | 1.58 | 0.84 | 1500 | 0.24 | 99.0 | 7 |
| Example 6 | chips | 1.49 | 1.97 | 5.1 | 1.4 | 1.83 | 0.64 | 1700 | 0.25 | 99.0 | 8 |

TABLE 1-continued

| | production conditions | | | | | properties of hydroxypropyl methyl cellulose | | | | | |
|---|---|---|---|---|---|---|---|---|---|---|---|
| | alkali cellulose | | etherification | | | | | | | | |
| | shape of | weight ratio | weight ratio | disintegration | | | | | | | |
| | pulp when contacted with NaOH (-) | of NaOH component in alkali cellulose to solid component in pulp (kg/kg) | of propylene oxide to solid component in pulp (kg/kg) | average particle size before disintegration (mm) | average particle size after disintegration (mm) | DS (-) | MS (-) | viscosity at 20° C. of 2% by weight aq. solution (mPa·s) | ash content (wt %) | transmittance (%) | number of insoluble fibers |
| Comp. Ex. 1 | sheet | 1.49 | 1.97 | 6.5 | — | 1.84 | 0.62 | 1200 | 8.52 | 99.0 | 12 |
| Comp. Ex. 2 | powder | 1.49 | 1.97 | 1.8 | — | 1.81 | 0.65 | 2000 | 0.25 | 95.0 | 98 |
| Comp. Ex. 3 | sheet | 1.25 | 1.31 | 2.0 | — | 1.90 | 0.24 | 1500 | 0.20 | 98.5 | 30 |
| Comp. Ex. 4 | sheet | 1.25 | 1.26 | 2.2 | — | 1.80 | 0.39 | 1800 | 0.51 | 98.0 | 28 |

The invention claimed is:

1. A method for producing hydroxypropyl methyl cellulose having a methoxy degree of substitution (DS) of from 1.4 to 2.2 and a hydroxypropoxy molar substitution (MS) of from 0.5 to 1.0, comprising steps of:
bringing sheet-like or chip-like pulp into contact with an alkali metal hydroxide solution to obtain a reaction product mixture containing alkali cellulose,
removing a liquid portion from the reaction product mixture to obtain the alkali cellulose,
reacting the obtained alkali cellulose with methyl chloride and propylene oxide to obtain crude hydroxypropyl methyl cellulose,
disintegrating the crude hydroxypropyl methyl cellulose to obtain disintegrated crude hydroxypropyl methyl cellulose,
dispersing the disintegrated crude hydroxypropyl methyl cellulose in water to obtain a slurry,
filtering the slurry to obtain a cake, and
washing the cake.

2. The method for producing hydroxypropyl methyl cellulose according to claim 1, wherein the crude hydroxypropyl methyl cellulose to be disintegrated has an average particle size of from 3.5 to 10.0 mm.

3. The method for producing hydroxypropyl methyl cellulose according to claim 1, wherein the disintegrated crude hydroxypropyl methyl cellulose has an average particle size of from 0.5 to 1.6 mm.

4. The method for producing hydroxypropyl methyl cellulose according to claim 1, wherein the step of disintegrating the crude hydroxypropyl methyl cellulose is carried out using a kneader.

5. The method for producing hydroxypropyl methyl cellulose according to claim 1, wherein the steps of filtering the slurry and washing the cake are carried out using a filtration-washing machine.

6. The method for producing hydroxypropyl methyl cellulose according to claim 2, wherein the disintegrated crude hydroxypropyl methyl cellulose has an average particle size of from 0.5 to 1.6 mm.

7. The method for producing hydroxypropyl methyl cellulose according to claim 2, wherein the step of disintegrating the crude hydroxypropyl methyl cellulose is carried out using a kneader.

8. The method for producing hydroxypropyl methyl cellulose according to claim 3, wherein the step of disintegrating the crude hydroxypropyl methyl cellulose is carried out using a kneader.

9. The method for producing hydroxypropyl methyl cellulose according to claim 6, wherein the step of disintegrating the crude hydroxypropyl methyl cellulose is carried out using a kneader.

10. The method for producing hydroxypropyl methyl cellulose according to claim 2, wherein the steps of filtering the slurry and washing the cake are carried out using a filtration-washing machine.

11. The method for producing hydroxypropyl methyl cellulose according to claim 3, wherein the steps of filtering the slurry and washing the cake are carried out using a filtration-washing machine.

12. The method for producing hydroxypropyl methyl cellulose according to claim 4, wherein the steps of filtering the slurry and washing the cake are carried out using a filtration-washing machine.

13. The method for producing hydroxypropyl methyl cellulose according to claim 6, wherein the steps of filtering the slurry and washing the cake are carried out using a filtration-washing machine.

14. The method for producing hydroxypropyl methyl cellulose according to claim 7, wherein the steps of filtering the slurry and washing the cake are carried out using a filtration-washing machine.

15. The method for producing hydroxypropyl methyl cellulose according to claim 8, wherein the steps of filtering the slurry and washing the cake are carried out using a filtration-washing machine.

16. The method for producing hydroxypropyl methyl cellulose according to claim 9, wherein the steps of filtering the slurry and washing the cake are carried out using a filtration-washing machine.

17. The method for producing hydroxypropyl methyl cellulose according to claim 1, wherein the hydroxypropyl methyl cellulose has a methoxy degree of substitution (DS) of from 1.58 to 1.84 and a hydroxypropoxy molar substitution (MS) of from 0.57 to 0.84.

* * * * *